United States Patent
Wakayama et al.

(10) Patent No.: US 7,511,659 B2
(45) Date of Patent: Mar. 31, 2009

(54) RADAR DEVICE

(75) Inventors: Toshio Wakayama, Tokyo (JP);
Masashi Mitsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 126 days.

(21) Appl. No.: 11/696,362

(22) Filed: Apr. 4, 2007

(65) Prior Publication Data
US 2008/0150795 A1    Jun. 26, 2008

(30) Foreign Application Priority Data
Dec. 25, 2006    (JP) .............................. 2006-347169

(51) Int. Cl.
*G01S 13/00*    (2006.01)

(52) U.S. Cl. ..................... 342/196; 342/127; 342/93; 342/107

(58) Field of Classification Search ............. 342/93, 342/107–112, 127, 195, 196
See application file for complete search history.

(56) References Cited

U.S. PATENT DOCUMENTS

| | | | | |
|---|---|---|---|---|
| 4,728,955 A | * | 3/1988 | Hane | 342/140 |
| 6,384,769 B1 | * | 5/2002 | Mitsumoto et al. | 342/109 |
| 6,400,306 B1 | * | 6/2002 | Nohara et al. | 342/25 R |
| 6,611,224 B1 | * | 8/2003 | Nysen et al. | 342/42 |
| 2006/0238405 A1 | * | 10/2006 | Wakayama et al. | 342/79 |
| 2008/0150795 A1 | * | 6/2008 | Wakayama et al. | 342/196 |
| 2008/0165049 A1 | * | 7/2008 | Wakayama et al. | 342/91 |

FOREIGN PATENT DOCUMENTS

| | | |
|---|---|---|
| JP | 3517520 | 1/2004 |
| JP | 2004-198312 | 7/2004 |

* cited by examiner

*Primary Examiner*—John B Sotomayor
(74) *Attorney, Agent, or Firm*—Oblon, Spivak, McClelland, Maier & Neustadt, P.C.

(57) ABSTRACT

To provide a radar device which employs fast Fourier transform in a beam combining process to reduce the operation amount, the radar device including: a Fourier transform section that extracts a received signal that is obtained from waves radiated from a same transmitting element and received by a receiving element, and subjects a signal series of the extracted received signal to Fourier transform to generate a signal of a spatial frequency domain; a phase compensation section that compensates the signal of the spatial frequency domain with a phase difference that is caused by a difference between a predetermined reference position and a position of the used transmitting element; and a coherent integration section that adds the signals of the spatial frequency domain after the signals have been subjected to the phase compensation processing, which are obtained with the plurality of transmitting elements, in each of the spatial frequencies.

6 Claims, 4 Drawing Sheets

RADAR DEVICE

BACKGROUND OF THE INVENTION

1. Field of the Invention

The present invention relates to a radar device, which employs a transmission changeover digital beam forming (DBF) system to measure an object.

2. Description of the Related Art

As a technique that receives electric waves that arrive from an external by means of a plurality of receiving elements, and combines the electric waves that have been received by the respective receiving elements through signal processing to discriminate the signals in each of arrival directions, there is known a technique that is called "digital beam forming".

As a technique for improving angular resolution when applying the DBF technique to a radar antenna, there has been proposed to change over the plurality of transmitting elements in time division to be used, thereby increasing an equivalent aperture with an array antenna having a small number of elements to narrow a beam width (for example, refer to JP 2004-198312 A).

However, in the radar disclosed in JP 2004-198312 A, when virtual receiving elements are arranged at irregular intervals, fast Fourier transform cannot be used as Fourier transform for conducting beam forming. The Fourier transform can be executed by an application of the general discrete Fourier transform, but the operation amount is remarkably increased as compared with the case of applying the fast Fourier transform. This is because, when it is assumed that a signal length is N, the operation amount of the fast Fourier transform is proportional to N log N, whereas the operation amount of the Fourier transform that is not made fast is proportional to $N^2$.

SUMMARY OF THE INVENTION

The present invention has been made to solve the above problem, and therefore an object of the present invention is to provide a radar device of a transmission changeover DBF type, which employs fast Fourier transform in a beam combining process to reduce the operation amount.

According to the present invention, there is provided a radar device having: a plurality of transmitting elements that are disposed at different positions, switched over, and radiate waves toward a space; at least one receiving element that receives the waves scattered by an object which exists externally; and receivers that detect the waves that are received by the receiving element and generate a received signal, the radar device that subjects the received signal to signal processing to measure the object, including:

a Fourier transform section that extracts the received signal that is obtained from the waves radiated from the same transmitting element and received by the receiving element, and subjects a signal series of the extracted received signal to Fourier transform to generate a signal of a spatial frequency domain;

a phase compensation section that compensates the signal of the spatial frequency domain that is generated by the Fourier transform section with a phase difference that is caused by a difference between a predetermined reference position and a position of the used transmitting element; and a coherent integration section that adds the signals of the spatial frequency domain after the signals have been subjected to the phase compensation processing, which are obtained with the plurality of transmitting elements, in each of the spatial frequencies.

An advantage of the radar device according to the present invention resides in that, because the transmission changeover DBF system is employed, and the beam forming is conducted by the fast Fourier transform, it is possible to reduce the operation amount of the beam forming, and to reduce the scale of the signal processing.

BRIEF DESCRIPTION OF THE DRAWINGS

In the accompanying drawings.

DETAILED DESCRIPTION OF THE PREFERRED EMBODIMENTS

Now, a description will be given of a preferred embodiment of the present invention with reference to the accompanying drawings.

Figure 1:
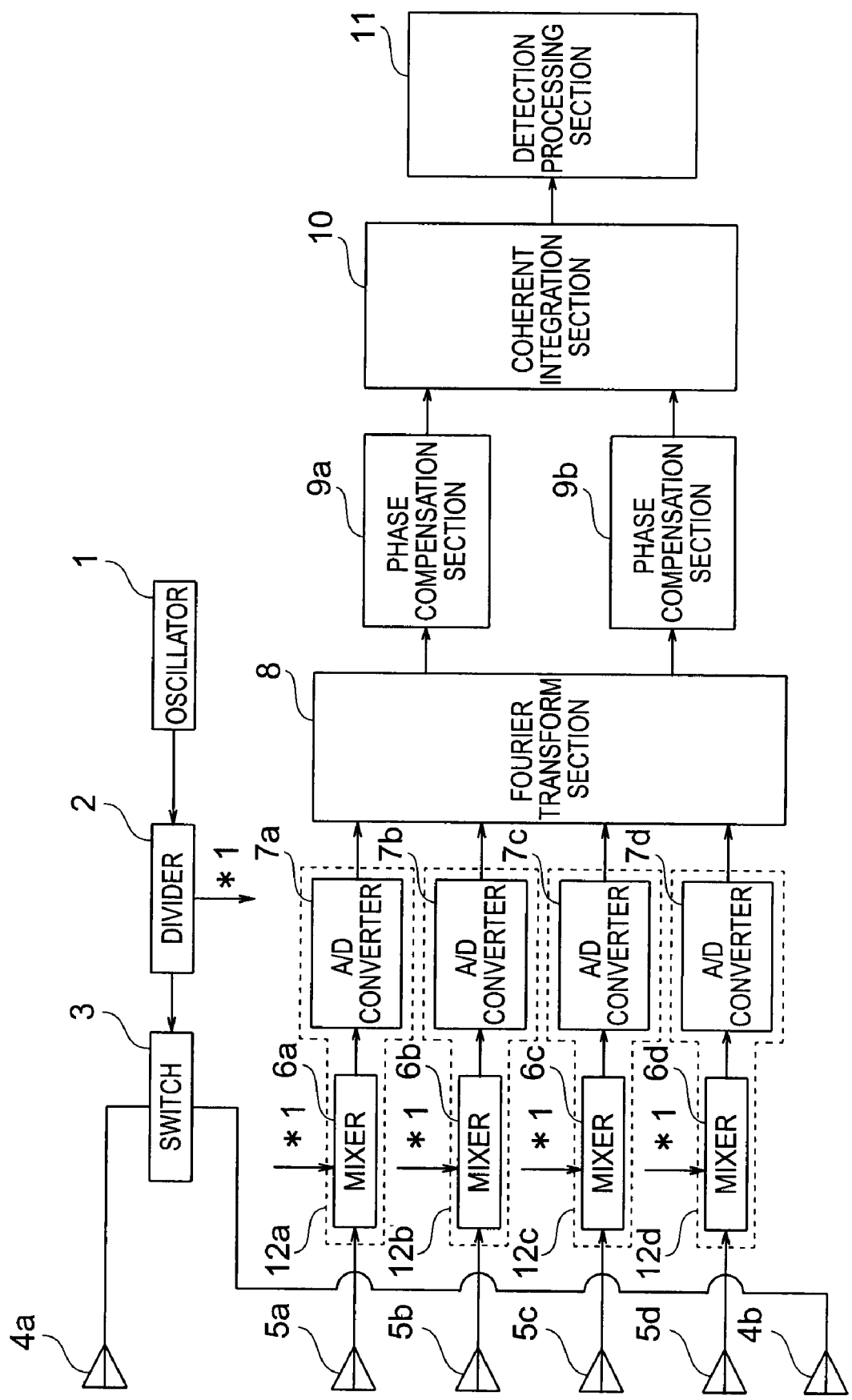
FIG. 1 is a block diagram showing the configuration of a radar device according to an embodiment of the present invention.

FIG. 1 is a block diagram showing an example of the configuration of a radar device according to the present invention.

As shown in FIG. 1, the radar device according to the present invention includes an oscillator 1 that oscillates a transmitted wave, a divider 2 that divides the transmitted wave outputted from the oscillator 1, a switch 3 that changes over an output of one divided transmitted wave, transmitting antennas 4a and 4b that function as transmitting elements which radiate reflected waves transmitted from the switch 3 to a space, receiving antennas 5a to 5d that function as receiving elements each of which takes in the reflected wave from the space, mixers 6a to 6d each of which mixes the transmitted wave and the reflected wave together to generate a beat signal, A/D converters 7a to 7d that subject the beat signal to A/D conversion, a Fourier transform section 8 that subjects a channel direction to fast Fourier transform, phase compensation sections 9a and 9b that compensate a phase difference that is caused by the changeover of the transmitting antennas 4a and 4b, a coherent integration section 10 that conducts coherent integration, and a detection processing section 11 that conducts a detecting process.

The four mixers 6a to 6d and the four A/D converters 7a to 7d constitute four receivers 12a to 12d, respectively.

In this case, there are four channels of receiving systems including the four receiving antennas 5a to 5d and the four receivers 12a to 12d. However, the present invention is applicable to a device including an arbitrary number of channels.

Also, in the configuration example of FIG. 1, the transmitted waves are transmitted while the two transmitting antennas 4a and 4b are changed over, and then received by the four receiving antennas 5a to 5d. As a result, eight combinations of the transmission and reception are realized, that is, eight logical channels are obtained. Logic channels 1 to 4 obtain the received signals with the transmitting antenna 4a and the receiving antennas 5a to 5d. Also, logical channels 5 to 8 obtain the received signals with the transmitting antenna 4b and the receiving antennas 5a to 5d.

In order to measure a distance to an object to be observed, the oscillator 1 subjects the transmitted wave to be oscillated to pulse modulation. However, the present invention does not depend on the distance measuring method and does not depend on the modulation or non-modulation of the transmitted wave, or the modulating method of the transmitted wave, but can be applied to the radar of an arbitrary modulating method.

Each of the receivers 12a to 12d mixes the reflected wave with the transmit wave to generate the beat signal, subjects the beat signal to the A/D conversion, and samples the converted signal to obtain a received signal $s_m(t_n)$ which is an observed value. Note that m is a logical channel No., and n, a sampling No. The Fourier transform section 8 extracts the received signals that are obtained from the reflected wave obtained by reflecting the transmitted wave radiated from the same transmitting antennas 4a and 4b by an reflective object, from the received signals $s_m(t_n)$ that are obtained from the receivers 12a to 12d. Then, the Fourier transform section 8 subjects the signal series of the extracted received signals to fast Fourier transform by using Expression (1) to generate a signal $G_{tx}$ of the spatial frequency domain. In this example, when subscript tx is 1, it is indicated that the transmitting antenna 4a is used, and when subscript tx is 2, it is indicated that the transmitting antenna 4b is used. That is, the received signal $s_{m,1}(t_n)$ is a signal of the logical channels 1 to 4 (m=1 to 4), and the received signal $s_{m,2}(t_n)$ is a signal of the logical channels 5 to 8 (m=5 to 8).

Also, $G_1$ results from subjecting the signals of the logical channels 1 to 4 to two-dimensional Fourier transform. $G_2$ results from subjecting the signals of the logical channels 5 to 8 to two-dimensional Fourier transform. $F_m F_n$ is two-dimensional Fourier transform of a channel direction and a sample direction. Because two-dimensional Fourier transform of Expression (1) is the normal Fourier transform having the regular data intervals and no phase compensation factor, it is possible to apply the fast Fourier transform.

Ex. 1

$$G_{tx} = F_m F_n [S_{m,tx}(t_n)] \quad (1)$$

The phase compensation sections 9a and 9b obtains a phase compensation coefficient $C_{tx}(\theta, m)$ related to the positions of the transmitting antennas 4a and 4b represented by Expression (2), and a phase compensation coefficient $C_{tm}(\theta, m)$ related to the receiving timing represented by Expression (3). The phase compensation coefficient $C_{tx}(\theta, m)$ related to the positions of the transmitting antennas 4a and 4b can be replaced with any one of $C_{tx1}(\theta)$ and $C_{tx2}(\theta)$ as represented by Expression (4). Also, the phase compensation coefficient $C_{tm}(\theta, m)$ related to the receiving timing can be replaced with any one of $C_{tm1}(\theta)$ and $C_{tm2}(\theta)$ as represented by Expression (5). In the expression, M is the number of logical channels, and M=8 is satisfied in the configuration example of FIG. 1.

The phase compensation sections 9a and 9b compensate the signal Gtx of the space frequency domain which is obtained by the Fourier conversion section 8 by the phase compensation coefficient $C_{tx}(\theta, m)$ related to the positions of the transmitting antennas 4a and 4b, and the phase compensation coefficient $C_{tm}(\theta, m)$ related to the receiving timing.

Ex. 2

$$C_{tx}(\theta, m) = \exp\left(-j\frac{2\pi}{\lambda} x_{tx,m} \sin\theta\right) \quad (2)$$

-continued $$C_{tm}(f_b, m) = \exp(-j2\pi f_b \Delta t_m) \quad (3)$$

$$C_{tx}(\theta, m) = \begin{cases} C_{tx1}(\theta), & 1 \leq m \leq M/2 \\ C_{tx2}(\theta), & M/2+1 \leq m \leq M \end{cases} \quad (4)$$

$$C_{tm}(\theta, m) = \begin{cases} C_{tm1}(\theta), & 1 \leq m \leq M/2 \\ C_{tm2}(\theta), & M/2+1 \leq m \leq M \end{cases} \quad (5)$$

The coherent integration section 10 adds the signals of the spatial frequency domain which has been subjected to the phase compensation processing obtained with the different transmitting antennas 4a and 4b to each of the spatial frequencies as shown in Expression (6), to thereby find a spacetime spectrum $S(f_b, \theta)$ which is separated in each components of the beat frequencies fb and the arrival angles $\theta$.

Ex. 3

$$S(f_b,\theta) = C_{tm1}(f_b)C_{tx1}(\theta) \cdot F_m F_n[S_{m,1}(t_n)] + C_{tm2}(f_b)C_{tx2}(\theta) \cdot F_m F_n[S_{m,2}(t_n)] \quad (6)$$

The detection processing section 11 determines that a signal corresponding to the reflective object exists at an angle where the peak power of the spacetime spectrum $S(fb, \theta)$ exceeds a set threshold value. As a method of setting the threshold value, there can be used, for example, a well-known constant false alarm rate (CFAR) method. However, the threshold value setting method is not included in the scope of the present invention, and an arbitrary manner can be employed.

Subsequently, the operation of the radar device according to the present invention will be described.

First, the transmitted wave is oscillated by the oscillator 1.

The transmitted wave that is oscillated by the oscillator 1 is divided by the divider 2 into two waves, one of which is inputted to the switch 3 and the other of which is inputted to the mixers 6a to 6d.

The switch 3 changes over the inputted transmitted wave to any one of the transmitting antenna 4a and the transmitting antenna 4b in time division, and outputs the transmitted wave. The transmitting antenna 4a or the transmitting antenna 4b radiates the transmitted wave to the space.

The radiated transmitted wave is reflected by an object that exists in the observation region. The reflected wave is received by the receiving antennas 5a to 5d.

Figure 2:
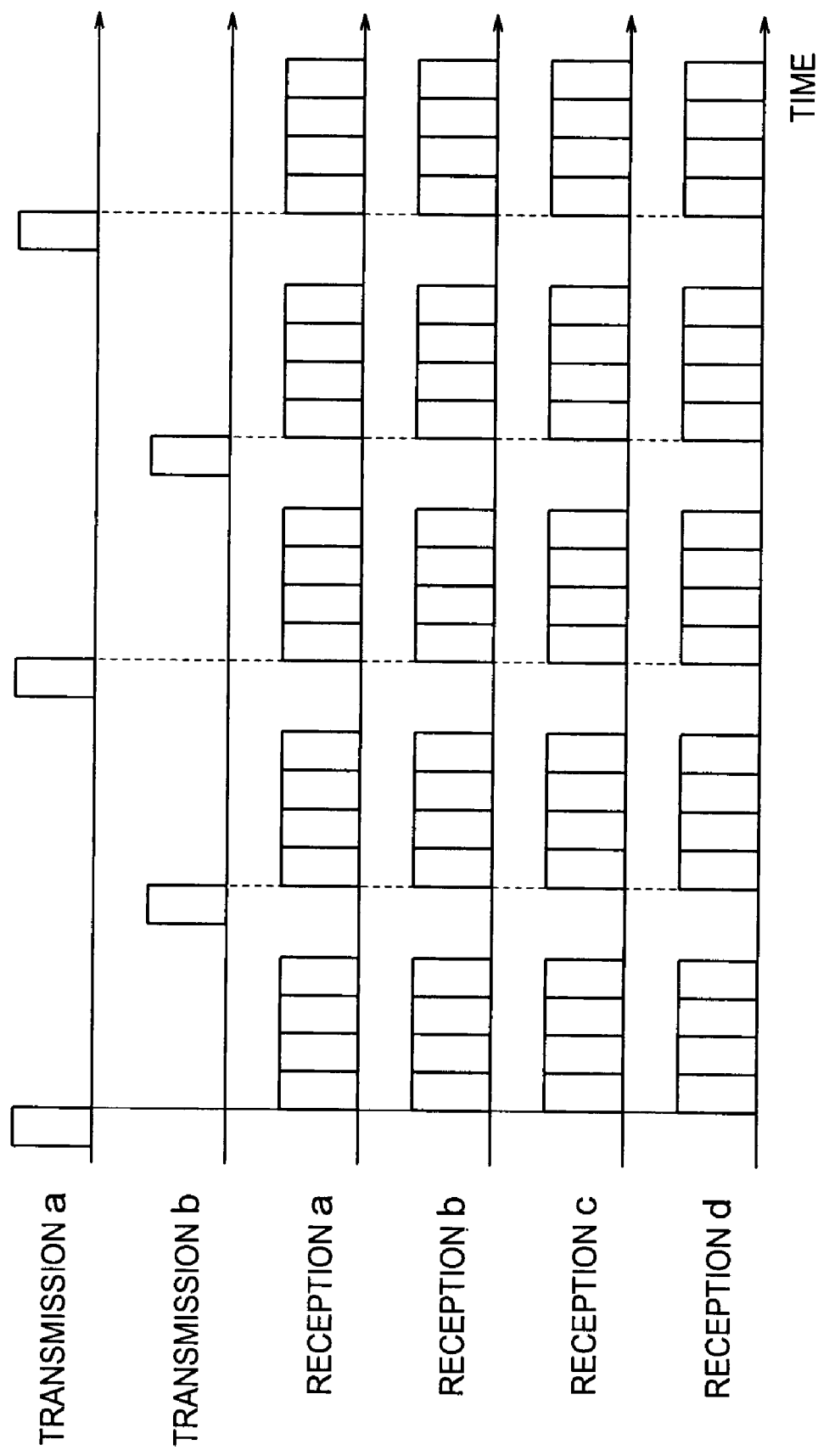
FIG. 2 is a timing chart of transmission and reception according to the embodiment of the present invention.

FIG. 2 shows an example of transmitting and receiving timing in the radar device according to the present invention.

A transmission "a" performed through the transmitting antenna 4a and a transmission "b" performed through the transmission antenna 4b are alternately conducted, and then received in correspondence with the respective transmitting timings immediately after pulse transmission. Receptions "5a" to "5d" are conducted at the same time with the receiving antennas 5a to 5d. In FIG. 2, it is assumed that a plurality of distances are observed, and samplings are conducted a plurality of times by the A/D converters 7a to 7d in each transmission.

The reflected waves that have been received by the receiving antennas 5a to 5d, respectively, are inputted to the mixers 6a to 6d which are connected to the receiving antennas 5a to 5d, respectively.

The mixers 6a to 6d mix the reflected waves that have been inputted from the receiving antennas 5a to 5d with the transmitted waves that have been inputted from the divider 2 to generate the received signals. Each of the received signals has a frequency whose value corresponds to a difference between the frequency of the reflected wave and the frequency of the transmitted wave. For example, in the case where the transmitted wave is an electromagnetic wave that is not modulated, the differential frequency becomes a Doppler frequency of the reflected wave, that is, a frequency that is in proportion to a relative velocity along the line of sight of the object (reflective object) that reflects the transmitted wave.

Also, in the case where the transmitted wave is subjected to frequency modulation, the differential frequency becomes a frequency that depends on a relative distance to the Doppler frequency of the reflective object.

The received signals that have been outputted from the respective mixers 6a to 6d are converted into digital signal from analog signals by the A/D converters 7a to 7d. In the example of FIG. 1, the digital signals of four channels are generated in correspondence with the four receiving antennas 5a to 5d. The received signals of the four channels are subjected to the Fourier transform process using the fast Fourier transform method with respect to the signal series in the channel direction by the Fourier transform section 8. Because the Fourier transform is conducted on the signals that are distributed in the spatial direction, the signals of the spatial frequency domain are obtained as the signals that have been subjected to the Fourier transform.

When the Fourier transform in the temporal direction is conducted together with the Fourier transform in the spatial direction, the spacetime spectrum that is defined on a two-dimensional plane having a spatial frequency axis and a beat frequency axis is obtained.

It is assumed that the receiving antennas 5a to 5d are arranged at regular intervals of "d". In this case, the phase of the received signal corresponding to the reflected wave that arrives from a direction of an angle θ linearly changes at regular intervals of $2\pi d \cdot \sin\theta/\lambda$. Therefore, when the Fourier transform is conducted on the signal in the Fourier transform section 8, a spectrum having a peak in the spatial frequency corresponding to the arrival angle θ is obtained. As a result, it is found that the reflective object exists in the angular direction corresponding to the spatial frequency at which the peak occurs.

The transmitted waves are alternately transmitted by the transmitting antenna 4a and the transmitting antenna 4b. The received signal obtained from the reflected wave of the transmitted wave that has been radiated from the transmitting antenna 4a is inputted to the phase compensation section 9a, and the received signal obtained from the reflected wave of the transmitted wave that has been radiated from the transmitting antenna 4b is inputted to the phase compensation section 9b. Because the transmitting antenna 4a and the transmitting antenna 4b are disposed at different positions, a transmitting/receiving path length that is the sum of the transmitting path extending from the transmitting antenna 4 to the reflective object and the receiving path extending from the reflective object to the receiving antenna 5 depends on the position of the transmitting antenna 4. A difference in the path length due to the positional difference of the transmitting antenna 4 becomes the phase difference of the received signal. Under the circumstances, the phase compensation section 9a and the phase compensation section 9b compensate the respective phases so that the received signal obtained from the reflected wave resulting from reflecting the transmitted wave radiated from the transmitting antenna 4a by the reflective object coincides in phase with the received signal obtained from the reflected wave resulting from reflecting the transmitted wave radiated from the transmitting antenna 4b by the reflective object.

Because it is necessary to conduct the phase compensation so that the phase difference between the both received signals is eliminated, the phase compensation can be conducted on one received signal even if the phases of the both received signals are not compensated. For example, in the case where the phase compensation is conducted on the basis of a phase value of the received signal obtained from the reflected wave resulting from reflecting the transmitted wave radiated from the transmitting antenna 4a by the reflective object, the phase compensation is conducted by the phase compensation section 9b only on the received signal obtained from the reflected wave resulting from reflecting the transmitted wave radiated from the transmitting antenna 4b by the reflective object. In this case, the phase compensation section 9a is not required.

The signal of the spatial frequency domain which has been compensated in the phase by the phase compensation section 9a or the phase compensation section 9b after the Fourier transform is subjected to the coherent integration by the coherent integration section 10, that is, a process of adding the signals of the spatial frequency domain in each angle while saving the phase is performed.

The signal that has been subjected to the coherent integration is equivalent to the signal that has been observed by an aperture length of the virtual element arrangement. The beam width is in reverse proportion to the aperture length. In the case where the aperture length is doubled, the beam width is reduced to be half. In order to conduct the beam forming corresponding to the beam width, the angular resolution in the case where the signal series of the total aperture length of the four elements is directly subjected to the Fourier transform is insufficient. In other words, the receiving beam forming is conducted at intervals twice as long as the beam width that has been combined in the virtual element arrangement. Under the circumstances, in the case where the Fourier transform is conducted in the Fourier transform section 8, 0 is added to the signal series to extend the length of the signal series on processing so that the angular resolution of the spatial vector that has been subjected to the Fourier transform becomes satisfactorily fine.

Figure 3:
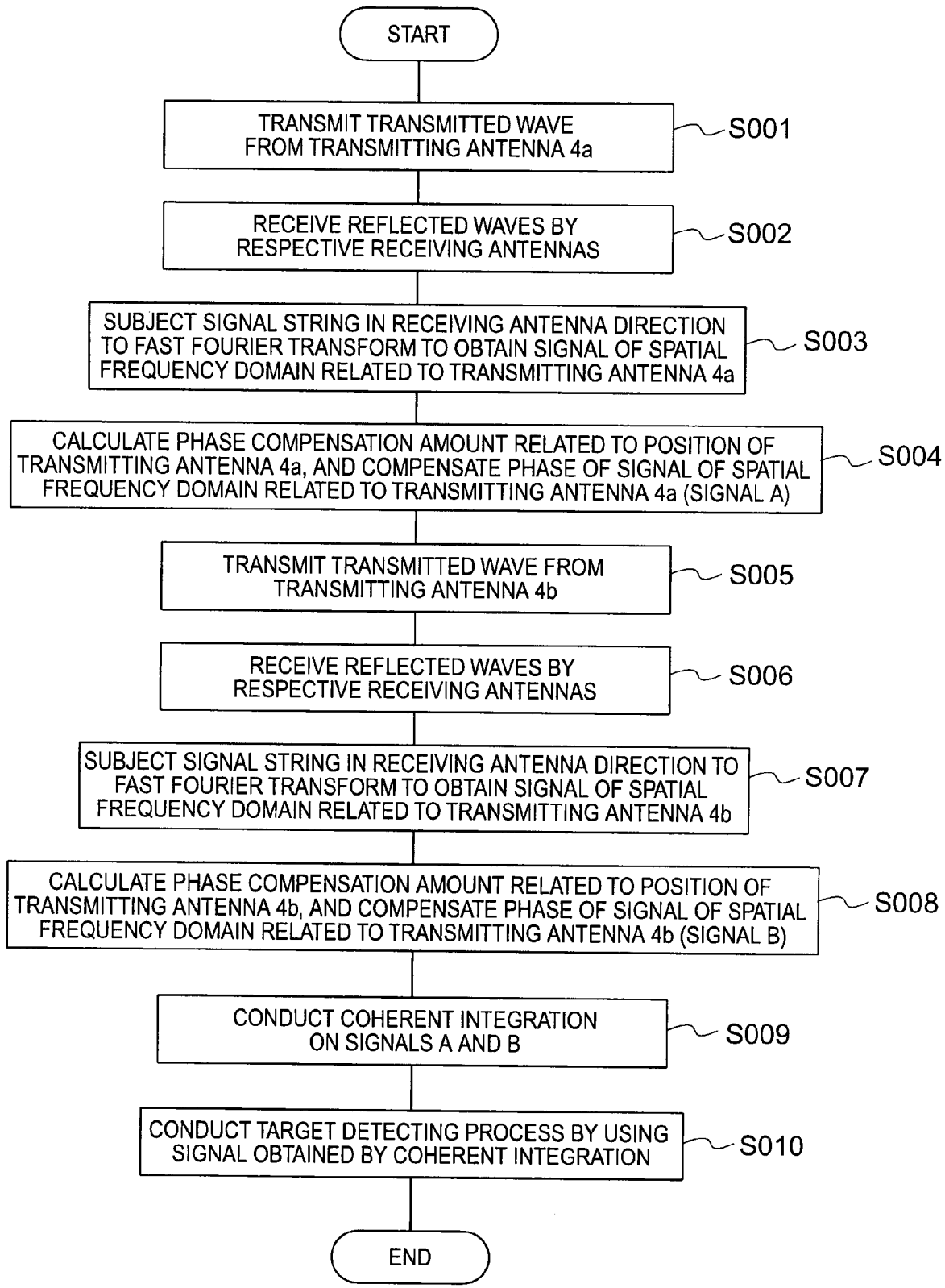
FIG. 3 is a flowchart showing the procedure performed by the radar device according to the embodiment of the present invention.

FIG. 3 is a flowchart showing an observing and processing procedure performed by the radar device according to the present invention.

In Step S001, the transmitted waves are transmitted from the transmitting antenna 4a.

In Step S002, the reflected waves are received in the respective receiving antennas 5a to 5d.

In Step S003, the reflected waves that have been received in Step S002 are mixed with the transmitted waves in the mixers 6a to 6d, then subjected to the A/D conversion by the A/D converters 7a to 7d, and thereafter sampled to obtain the signal series. Then, the signal series thus obtained is subjected to the fast Fourier transform process by the Fourier transform section 8 to obtain the signal of the spatial frequency domain.

In Step S004, the phase compensation amount at the position of the transmitting antenna 4a is calculated, and the signal of the spatial frequency domain is then compensated with the phase compensation amount (signal A).

In Step S005, the transmitted waves are transmitted from the transmitting antenna 4b.

In Step S006, the reflected waves are received in the respective receiving antennas 5a to 5d.

In Step S007, the reflected waves that have been received in Step S006 are mixed with the transmitted waves in the mixers 6a to 6d, then subjected to the A/D conversion by the A/D converters 7a to 7d, and thereafter sampled to obtain the signal series. Then, the signal series thus obtained is subjected to the fast Fourier transform process by the Fourier transform section 8 to obtain the signal of the spatial frequency domain.

In Step S008, the phase compensation amount at the position of the transmitting antenna 4b is calculated, and the signal of the spatial frequency domain is then compensated with the phase compensation amount (signal B).

In Step S009, the signal A of the spatial frequency domain which has been compensated in the phase in Step S004 is added to the signal B of the spatial frequency domain which has been compensated in the phase in Step S008 to obtain the spacetime spectrum.

In Step S010, the spacetime spectrum that has been subjected to the coherent integration, which has been obtained in Step S009, is analyzed, and then subjected to a target detecting process.

Subsequently, a reason why the fast Fourier transform is applicable in the Fourier transform process will be described.

The received signals $s_m(t_n)$ obtained by the receivers 12a to 12d are represented by Expression (7). In the expression, A denotes the amplitude of the beat signal, $f_b$, a beat frequency, $x_{rx,m}$, a position of the receiving antenna 5 which is used to obtain an m-th logical channel, $x_{tx,m}$, a position of the transmitting antenna 4 which is used to obtain an m-th logical channel, $\theta$, an arrival direction of the receiving wave (a front direction is defined as 0 degrees), $t_n$, a time of an n-th sample, $\Delta t_m$, a time difference of sample timing between the m-th logical channel and the first logical channel, and $\phi_0$, an initial phase of the beat signal in the case where it is assumed that the signals are transmitted or received from an origin.

Ex. 4

$$s_m(t_n) = A\exp(j2\pi f_b t_n + j\phi_0) \cdot \qquad (7)$$
$$\exp\left(j\frac{2\pi}{\lambda}x_{rx,m}\sin\theta\right) \cdot \exp\left(j\frac{2\pi}{\lambda}x_{tx,m}\sin\theta\right) \cdot \exp(j2\pi f_b \Delta t_m)$$

Also, a coefficient $C_{tm}(f_b, m)$ that compensates the phase shifting due to the difference of the sample timing is calculated by using Expression (2). Also, a coefficient $C_{tx}(\theta, m)$ that compensates the phase shifting due to the difference of the position of the transmitting antenna 4 is calculated by using Expression (3).

Then, a spacetime spectrum $S(f_b, \theta)$ that is a signal resulting from separating the received signal $s_m(t_n)$ of Expression (7) in each components of the beat frequency $f_b$ and the arrival angle $\theta$ is calculated by the two-dimensional Fourier transform with the phase compensation of Expression (8).

Ex. 5

$$S(f_b, \theta) = \qquad (8)$$
$$\sum_{m=1}^{M}\sum_{n=1}^{N} s_m(t_n) C_{tm}(f_b, m) C_{tx}(\theta, m) \exp(-j2\pi f_b t_n)\exp\left(-j\frac{2\pi}{\lambda}x_{rx,m}\sin\theta\right)$$

Then, the phase shifting due to the difference of the sample timing is determined by only the difference between the transmitting antennas 4a and 4b, and does not depend on the receiving antennas 5a to 5d. Accordingly, in the receiving beam forming using the received signals of only the logical channels 1 to 4 using the transmitting antenna 4a, because there is no phase shifting due to the difference of the sample timing between the logical channels, the phase compensation related to the sample timing is not required.

Also, the intervals of the receiving antennas 5a to 5d between the respective logical channels are regular. Therefore, the fast Fourier transform can be used for the Fourier transform for combining the receiving beams using the received signals of only the logical channels 1 to 4.

Likewise, the fast Fourier transform can be used for the Fourier transform for combining the receiving beams using the received signals of only the logical channels 5 to 8. The spatial spectrums that are obtained by those two fast Fourier transforms are obtained at different observing times due to the difference in the sample timing. A phase compensation factor that compensates the observation time difference is multiplied, and the results of the two-dimensional Fourier transform are added, thereby making it possible to realize the beat spectrum calculation and the receiving beam forming using the logical channels 1 to 8.

As described above, both of the phase compensation factor $C_{tx}$ related to the position of the transmitting antenna 4 and the phase compensation factor $C_{tm}$ related to the sample timing are constant by the unit of channels 1 to M/2 or the channels (M/2+1) to M, and do not depend on the channel No. and the sample No. Therefore, in Expression (8), it is possible to set the phase compensation factors out of the Fourier transform.

Figure 4:
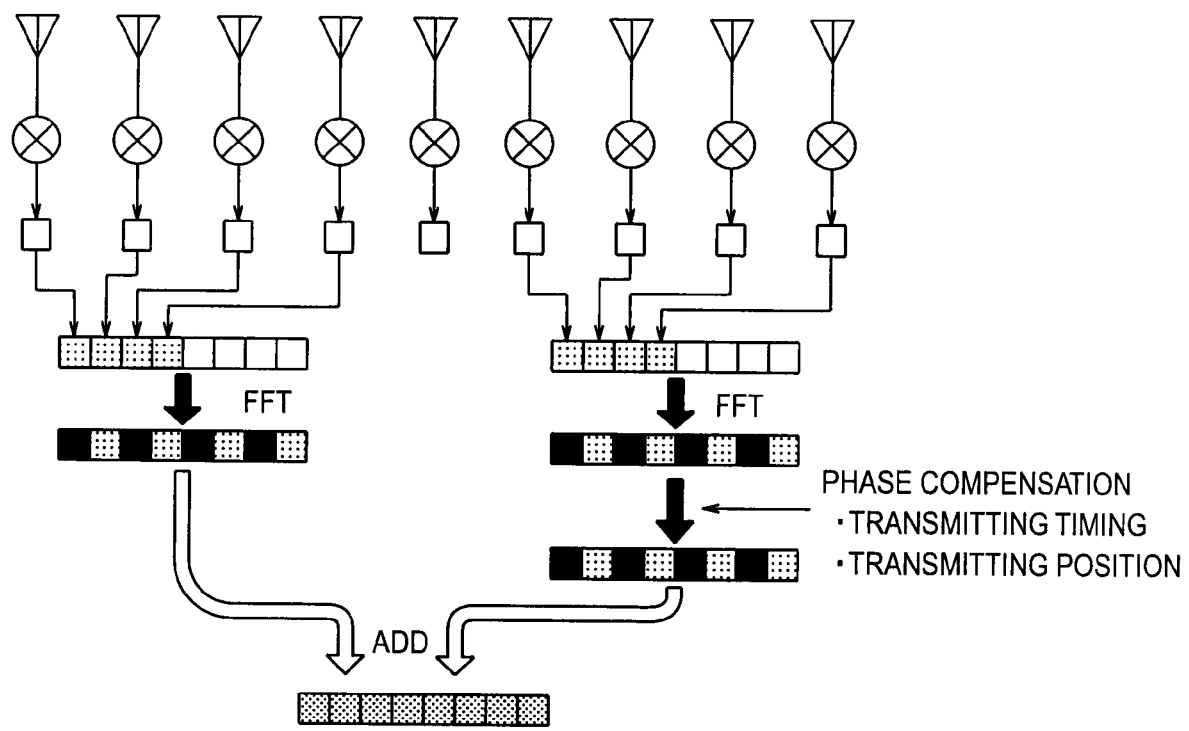
FIG. 4 is a schematic diagram for explaining a beam combining method according to the embodiment of the present invention.

In the case of conducting the two-dimensional fast Fourier transform in each of the transmitting antennas 4, because the number of logical channels is the half of all channels, i.e., M/2, the angular resolution is deteriorated to twice when the fast Fourier transform is directly conducted. Under the circumstances, there is proposed that data points are increased with 0 in the logical channel direction before the two-dimensional fast Fourier transform is conducted. The above processing is schematically shown in FIG. 4.

Also, the above embodiment shows a structural example that compensates the phase difference which is caused by the time difference occurring when the transmission changes over to the time division. However, as is understood from Expression (1) or Expression (7), the phase difference caused by the time difference is in proportion to a product of the beat frequency and the time difference. For that reason, in the case where the above embodiment is applied in a status where it is considered that the subject beat frequency is sufficiently small, the compensation of the phase difference which is caused by the time difference of the transmission can be omitted. For example, in the case of the radar device that conducts the frequency modulation, the beat frequency is represented by the sum of a term that is in proportion to the target distance, and a term that is in proportion to the Doppler frequency. Therefore, in the case of dealing only with a short-distance object at a relatively low velocity, the compensation of the phase difference that is caused by the time difference of transmission can be omitted.

Also, in the above embodiment, the Fourier transforms in the temporal direction and the spatial direction are executed by the Fourier transform section 8 with respect to the received signal that has been sampled by the A/D converter 7. However, in the case where it is unnecessary to obtain only the spatial frequency, that is, in the case where it is unnecessary to obtain information on the beat frequency, the Fourier transform in the spatial direction may be executed by the Fourier transform section 8.

Since the radar device of the transmission changeover DBF type according to the above embodiment of the present invention, which employs the fast Fourier transform in the beam combining process, it is possible to reduce the operation amount of the beam forming and downsize the scale of the signal processing.

What is claimed is:

1. A radar device having: a plurality of transmitting elements that are disposed at different positions, switched over, and radiate waves toward a space; at least one receiving element that receives the waves scattered by an object which exists externally; and receivers that detect the waves that are received by the receiving element and generate a received signal, the radar device that subjects the received signal to signal processing to measure the object, comprising:

a Fourier transform section that extracts the received signal that is obtained from the waves radiated from the same transmitting element and received by the receiving element, and subjects a signal series of the extracted received signal to Fourier transform to generate a signal of a spatial frequency domain;

a phase compensation section that compensates the signal of the spatial frequency domain that is generated by the Fourier transform section with a phase difference that is caused by a difference between a predetermined reference position and a position of the used transmitting element; and a coherent integration section that adds the signals of the spatial frequency domain after the signals have been subjected to the phase compensation processing, which are obtained with the plurality of transmitting elements, in each of the spatial frequencies.

2. The radar device according to claim 1, wherein the phase compensation section compensates the signal of the spatial frequency domain which is generated by the Fourier transform section with a phase difference that is caused by a difference in wave radiation time between the transmitting elements.

3. The radar device according to claim 1, wherein the Fourier transform section subjects the received signal to the fast Fourier transform to generate the signal of the spatial frequency domain.

4. The radar device according to claim 1, wherein the Fourier transform section inserts a predetermined signal series to the signal series of the extracted received signal, and then subjects the signal series of the received signal to the Fourier transform.

5. The radar device according to claim 4, wherein the predetermined signal series is a signal series consisting of 0.

6. The radar device according to claim 1, wherein the Fourier transform section conducts the Fourier transform in an element direction and in a temporal direction.

* * * * *